United States Patent

Morrish et al.

Patent Number: 5,130,606
Date of Patent: Jul. 14, 1992

[54] METHOD AND APPARATUS FOR INCREASING THE CATHODE EFFICIENCY IN A CATHODE RAY TUBE

[75] Inventors: Andrew J. Morrish, Eastleigh; Julian D. Williams, Marchwood; David J. Eagle, Chandlers Ford; Adrian M. Clitheroe, Fareham, all of England

[73] Assignee: International Business Machines Corporation, Armonk, N.Y.

[21] Appl. No.: 520,908

[22] Filed: May 9, 1990

[30] Foreign Application Priority Data

May 20, 1989 [GB] United Kingdom ............... 8911656

[51] Int. Cl.$^5$ ............................................. H01J 29/98
[52] U.S. Cl. ................................... 315/107; 315/94; 315/106; 315/291
[58] Field of Search ................ 315/107, 94, 105, 106, 315/291, 307, 158, 219

[56] References Cited

U.S. PATENT DOCUMENTS 4,149,110  4/1979  Dallos et al. .................. 315/107
4,247,801  1/1981  Dallos et al. .................. 315/107

OTHER PUBLICATIONS

IBM TDB, vol. 9, No. 29, Feb. 89, pp. 3896-3898.

Primary Examiner—Eugene R. LaRoche
Assistant Examiner—Ali Neyzari
Attorney, Agent, or Firm—Joscelyn G. Cockburn

[57] ABSTRACT

A CRT display system is described wherein a measure of the beam current generated within the CRT is derived and the voltage across the cathode heater modified as a function of this measure. In this way the optimum voltage across the heater coils is maintained, thus preventing "cathode stripping" at times of peak beam currents, and optimizing the CRT's working lifetime.

6 Claims, 1 Drawing Sheet

U.S. Patent
July 14, 1992
5,130,606
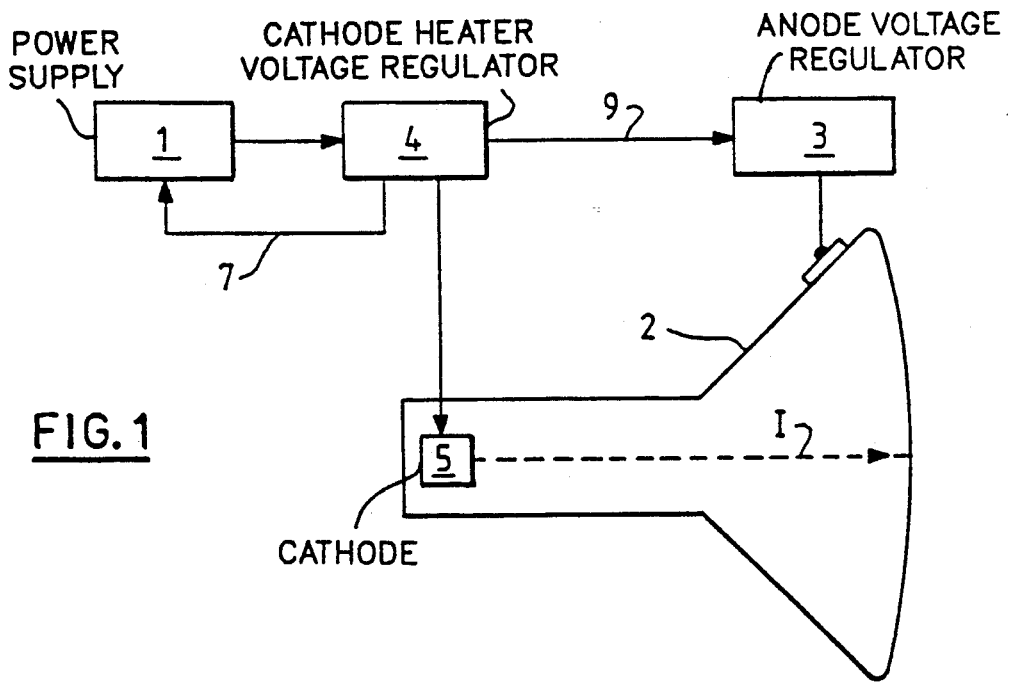
FIG. 1
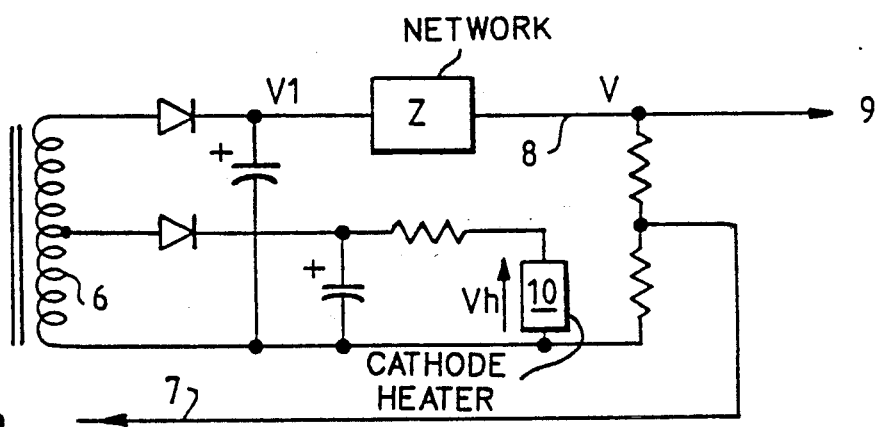
FIG. 2
FIG. 3
A.) $Z=R$ FOR $IR<VD$
$Z=0$ FOR $IR>VD$
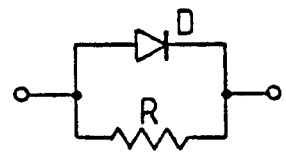 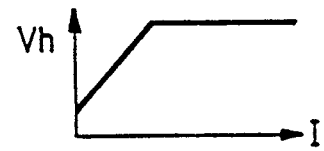
B.) $Z=R$
 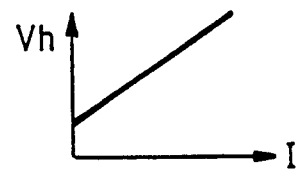
C.) $Z=r2$ FOR $IR<VD$
$Z=\dfrac{R1R2}{R1+R2}$ FOR $IR>VD$
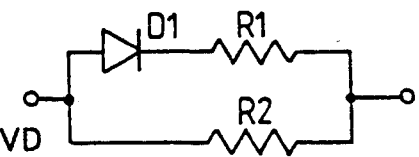 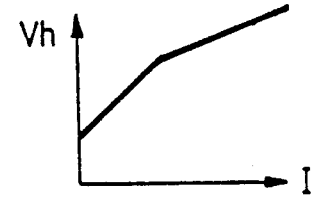

METHOD AND APPARATUS FOR INCREASING THE CATHODE EFFICIENCY IN A CATHODE RAY TUBE

BACKGROUND OF THE INVENTION

1. Field of the Invention

The present invention relates to a method and apparatus for increasing the efficiency of a cathode for a cathode ray tube.

2. Prior Art

A component of many display systems is the cathode ray tube (CRT) which utilises a cathode to produce electrons by thermionic emission. The electrons are accelerated and deflected to yield an image on a screen. The brightness or luminous intensity of this image can be related to the number of electrons attracted to the screen at any one time, (this electron stream is termed the beam current) with increased brightness resulting from higher beam currents.

A cathode is frequently composed of carbonates of barium and strontium that are converted to oxides in a vacuum. When the cathode is activated, an excess of barium oxide (or strontium oxide) is produced and, in this state, the cathode becomes highly conductive at the operating temperature (typically around 1000° K.), yielding a copious supply of electrons. The amount of excess barium oxide, and hence the supply of electrons, increases with temperature. The cathode, however, has only a finite supply of barium and, once depleted, the supply of electrons ceases.

There is a relationship between a cathode heater's voltage, the cathode temperature and the lifetime of the CRT. In the prior art there are two common ways of supplying the heater voltage; firstly using a horizontal flyback voltage with suitable limiting resistors to supply a rms voltage, or secondly DC regulated supply. In both cases the average heater power is heavily regulated to a fixed value (based on a predicted average beam current) as recommended by the CRT manufacturer to ensure long life. Problems can arise when high beam currents are required, in that insufficient free electrons are present at the surface of the cathode, and cathode stripping occurs (that is the monitor is unable to meet the brightness requirement). Increasing the cathode temperature (that is the cathode heater voltage) would prevent this but would necessarily lead to shortened CRT lifetime.

With the continual drive towards improved performance, one of the requirements of today's monitors is to provide increased display brightness, while maintaining a long CRT working life.

SUMMARY OF THE INVENTION

An object of the present invention is to provide a method of satisfying the conflicting interests of prolonged CRT lifetime, while meeting the need for an increased brightness capability.

Another object of the invention is to provide apparatus to adjust the cathode heater voltage, and hence the cathode temperature, as a function of the beam current.

According to one aspect of this invention, a cathode heater circuit is provided for a CRT characterized in that this circuit includes means for deriving a measure of the beam current within the CRT and for varying a voltage across the cathode's heater coils as a function of this measure.

According to another aspect of the invention a method for increasing the cathode efficiency within a CRT is provided, wherein the voltage across the cathode's heater coils is dynamically variable as a function of beam current.

BRIEF DESCRIPTION OF THE DRAWINGS

A specific embodiment of the invention will now be described with the aid of the accompanying drawings in which:

FIG. 1 is a schematic illustrating the invention;

FIG. 2 is a example of a circuit;

FIG. 3a, 3b an 3c show different relationships between heater voltage and beam current.

DESCRIPTION OF THE PREFERRED EMBODIMENT

FIG. 1 illustrates the overall concept behind the invention. Block 1, supplies power to a CRT (2). Block 3 represents an anode voltage generator; changing the anode voltage used to attract electrons to the screen can be utilized to vary the beam current (I) within the CRT (2). The beam current is "sensed" and the cathode heater voltage regulated as a function of the beam current, by block 4. In this way, the supply of electrons generated at any one time by the cathode (5) for the desired beam current (I) is optimised.

In the simplest case the system would have three modes of operation, corresponding to the zero, maximum, or some intermediate beam current. In a zero, or very low beam current situation, the heater voltage would be maintained at a lower limit, and at an upper limit during times of maximum beam current. In an intermediate condition the heater voltage would be regulated to a value proportional to the beam current. The upper and lower limits would be chosen in conjunction with the CRT manufacturer, to ensure that the temperature of the cathode would always be sufficient to supply the number of electrons required.

By way of example, a circuit is shown in FIG. 2 which could perform the task of "sensing" the beam current and subsequently modifying the cathode heater voltage accordingly. The solution shown utilized the feedback control loop of a switch mode power supply unit (block 1 in FIG. 1—such units are frequently incorporated in display systems which utilise CRTs). A transformer (6), draws power from the power supply (1), while a feedback loop (line 7) to the power supply (1), works to maintain high voltage supply rail (8) at a constant voltage V.

Z is a network used to provide the desired heater voltage, beam current (Vh-I) characteristic as recommended by the CRT manufacturer. Power is supplied to, for example, the anode voltage generator (3) along line 9. When a higher beam current (I) is required, more power is drawn, which results in DC rectified voltage V1 being greater than V, the difference between the two being dependent on the characteristics of Z and the amount of power drawn off (which in turn is related to the desired beam current).

As the power drawn increases (this is analogous to a larger beam current), DC rectified voltage V1 increases to maintain the high voltage rail 8 at constant voltage V. From the circuit shown, it is apparent that Vh is a fraction of V1. Hence, as V1 increases, so does Vh, thereby resulting in greater energy being imparted by the cathode heater 10 and the generation of a greater number of electrons; the relationship between the relative change in Vh and beam current is defined by the characteristics of network Z.

FIG. 3a, shows the Vh-I characteristics for one particular embodiment, where Z is composed of a resistor (R) in parallel with a diode (D). FIGS. 3b and c illustrate other Vh-I characteristics, Z consisting of a resistor (R) in FIG. 3b and of a diode (D1) in series with a resistor (R1), both components in parallel with a second resistor (R2) in FIG. 3c.

Clearly different Vh-I characteristics could be realized using more complex networks in location Z, depending on the Vh-I characteristics recommended by the CRT manufacturer. Although at times of maximum stress, that is when peak beam currents are required, the heater voltage and hence the cathode temperature would be greater than a fixed mean value, over a period of time the ability of the system described to vary the heater voltage with beam current would result in a decreased average heater voltage, and thus an increase in CRT lifetime. An added benefit of the system described is that the ability of the heater voltage to vary dynamically as a function of beam current, would greatly decrease the likelihood of cathode stripping.

Using the method described and by employing a simple circuit such as the one illustrated, the life time of the CRT is extended while the high brightness required in modern designs is achieved.

We claim:

1. In a CRT display system having a tubular envelope with a screen area for displaying images, an electron gun means positioned within said envelope an having an electronically heatable cathode for generating a cathode current of electrons which strike said screen area and an anode disposed relative to the screen area in spaced alignment with the electronically heatable cathode, a cathode heater circuit arrangement comprising:
   a switch mode power supply with an output transformer winding for providing output power to the CRT display system;
   an anode voltage generator for providing a variable anode voltage connected to the anode; and
   a control means coupled to the output transformer winding; said control means including a first device connected to one end of the output transformer winding and a first node; said first device rectifying voltage on said output transformer;
   a first storage means interconnecting the first node to another end of the output transformer;
   a circuit means for generating a desired heater voltage interconnected between the first node (V1) and a second node (V);
   a voltage divider circuit means interconnecting the second node to the other end of the output transformer;
   a feedback loop interconnecting the voltage divider circuit means to the switch mode power supply; and
   a circuit arrangement for generating a heater voltage proportional to a voltage on the first node interconnected between a tap point on said output transformer winding and the another end of the output transformer winding.

2. A cathode heater circuit as claimed in claim 1, further comprising a voltage generator (3) coupled to the circuit means, said voltage generator generating the CRT display final anode voltage in response to the power drawn from the power supply.

3. A cathode heater circuit as claimed in claim 1 or 2, wherein circuit means comprises a resistor (R).

4. A cathode heater circuit as claimed in claim 1 or 2, wherein circuit means comprises a diode (D) connected in parallel with a resistor (R).

5. A cathode heater circuit as claimed in claim 1 or 2, wherein circuit means comprises a series connected diode (D1) and resistor (R1) connected in parallel with a second resistor (R2).

6. In a CRT display system having a tubular envelope with a screen area for displaying images, an electron gun means positioned within said envelope and having an electronically heatable cathode for generating a cathode current of electrons which strike said screen area and an anode disposed relative tot he screen area in spaced alignment with the electronically heatable cathode, a circuit arrangement comprising:
   a first means (4) coupled to sense electron beam current within said envelope and dynamically regulating heater voltages as a function of said current;
   a second means (3) for generating anode voltages connected to the first means and the anode;
   a power supply for providing power to the CRT display system connected to the first means; and a feedback loop interconnecting the first means and the power supply.

* * * * *